United States Patent Office 3,454,377
Patented July 8, 1969

3,454,377
PACKAGED FUEL SUPPLEMENT
Charles S. Renwick, Jr., P.O. Box 5996,
Carmel, Calif. 93921
No Drawing. Filed Feb. 20, 1967, Ser. No. 617,088
Int. Cl. C10l 5/44; A61l 9/02
U.S. Cl. 44—40
8 Claims

ABSTRACT OF THE DISCLOSURE

A wet composition containing a mixture of herbs and combustible hygroscopic substances, which when subjected to spontaneous combustion while confined in an enclosure having apertures which allow for limited air inflow, emanates a fragrant and appetizing odor for a prolonged period of time. The composition is especially useful for providing a pleasant environment during home barbecuing.

---

This invention is directed to a combustible composition for producing a pleasant, fragrant environment during barbecuing and the like.

During the conventional home barbecuing of foods such as meat, fowl and fish, undesirable odors are usually produced by the combustion of fat and/or portions of the food itself. Therefore, where possible, it is desirable to separate the barbecuing equipment from the area in which the food will ultimately be consumed. However, this arrangement is not always convenient, particularly where the outdoor area is of limited size.

Therefore, this invention is directed to a fuel supplement that can be conveniently introduced into a barbecue fire for the purpose of providing a pleasant, appetizing fragrance that will also assist in making undesirable odors that may emanate from the burning charcoal and cooking food. In essence, the present invention is directed to a smokeless fuel supplement which is obtained by combining comminuted herbs, water and a finely-divided, combustible hygroscopic substance.

More specifically, it has been found that this wet composition is particularly effective when packaged in an airtight, noncombustible, perforatable enclosure. When the fragrant odor is desired, the airtight, noncombustible enclosure is partially opened, as by perforating or puncturing, and placed in an open fire such as a bed of glowing charcoal. As the various ingredients, set forth in more detail hereinafter, are heated, they sequentially volatilize and thereby provide a pleasingly fragrant and appetizing odor for a prolonged period of time.

The wet combustible composition of this invention is obtained by first thoroughly mixing a finely-divided, cellulosic, hygroscopic substance with comminuted herbs. Then this mixture is submerged or soaked in water for a time sufficient to fully saturate the intermixed components. The excess of water is drained off and the mixture squeezed, leaving a wet, pliable pulp or mass. The resulting wet mass is subsequently pressed, rolled, cut or shaped for insertion in an airtight noncombustible enclosure such as, for example, aluminum foil. The container is then closed or sealed shut in a conventional manner such as with staples, tape, glue and the like. The finished product can be produced in almost any geometric shape or form such as a ball, cube, or the like. For convenience, it is advantageous to package the wet composition in the form of a briquette.

During storage of the packaged product containing the intimate mixture of water, hygroscopic substance and herbs, it appears that the water leaches or dissolves at least some of the soluble components contained in the herbs. These soluble materials include at least some of the volatile essences of the herbs. As a result, when the airtight outer covering surrounding the wet mass is punctured and the punctured enclosure positioned with the punctures along the upward facing surface on a barbecue fire, the heat of the glowing charcoal raises the temperature of the packaged composition. When the temperature reaches the boiling point of water, the water vaporizes along with the essences which are dissolved therein and an initial fragrance emanates from the perforated enclosure into the surrounding environment.

When all of the water and volatile herb components have been vaporized, the temperature of the remaining components will continue to rise until the kindling temperature of one of the remaining components is attained. Because the composition is confined in a receptacle having apertures which restrict the inflow of air, continuous combustion does not occur. However, sporadic spontaneous combustion does is produced within the perforated enclosure and small quantities, i.e., "pockets," of hygroscopic material and/or herbs tend to vaporize. The vaporization is inherently of short duration because of the limited quantity of air (oxygen) present within the perforated enclosure at any one time. This sporadic volatilization, hereinafter referred to as "wafting," produces intermittent surges of the appetizing herb order. The odor emanation then subsides for a brief time until more air permeates the enclosure. Then the wafting cycle is repeated. The time interval between these intense emissions of herb fragrance will vary inversely with the proportion of herbs present in the total composition, i.e., as the proportion of herbs is increased, the intervals of minimal fragrance emissions will be reduced.

In a preferred embodiment, a hygroscopic substance is employed which has a kindling temperature below that of the herbs. As a result, voids are produced within the enclosure by the consumption of the cellulosic, hygroscopic substance when insure the formation of "air pockets" to produce wafting of the herb odors. In addition, herb consumption will not be completed until the other components are consumed. As a result, the release of the appetizing fragrance of the herbs is extended over a time period which is similar to that required to complete the barbecuing process.

The term herbs, as used in this invention, includes all of the parts of a herb plant which grow above the ground surfaces. These include such portions as the stalks, stems, leaves, buds, flowers, seeds and the like. It is preferable to utilize green herb plants, i.e., those which have not been dried, to insure that their eventual combustion will be delayed. Herbs which have been found to be particularly advantageous when employed in this invention include oregano, marjoram, thyme, sage, rosemary, mint, bay leaves and the like and combinations of these. Of course, it will be apparent to those of skill in this art that many other herb plants can be used.

Examples of cellulosic, combustible, hygroscopic substances which can be employed in this invention include such materials as natural and synthetic wood products. Of particular application are comminuted natural wood products such as finely ground sawdust, obtained, for example, from redwood, spruce, pine, fir, hickory and the like. The hygroscopic substance can be employed in either a wet or dry form, but preferably is utilized in a wet form as the subsequent saturation thereof will be more easily and effectively accomplished.

In the preparation of the product of this invention, it is advantageous to reduce the herb plant to a particle size less than about one-quarter inch in largest dimension. This can be accomplished in any conventional manner such as by means of mechanical grinders or choppers. In this regard, the term "comminuted," when employed in this specification and claims, is intended to denote a state of subdivision ranging from coarse and granular to powdered and including narrow or wide ranges of the particle sizes all of which may be present in a particular batch of a component.

The comminuted herbs are then mixed with finely ground hygroscopic substance in proportions which will provide sufficient herbs to produce the desired intensity of aromatic fragrance throughout a lengthy barbecuing process. It has been found advantageous to employ about 50% to 75% by volume of ground herbs and from about 25% to 50% by volume of comminuted hygroscopic substance.

As previously described, the mixture of herbs and hygroscopic substance is then saturated with water. The excess water is removed leaving a damp mass containing sufficient water to provide the necessary leaching (or liquid extraction) of soluble essenses from the herbs during subsequent storage of the wet mass in the airtight, noncombustible perforatable container.

The perforatable enclosure may be in the form of a bag-like member constructed of aluminum foil and sealed shut with staples or in some other conventional manner. The term "enclosure" is also intended to include cans and other conventional shapes of container which are useful for holding the water-containing mass as set forth herein.

By way of a particular example, fresh oregano, marjoram, rosemary, bay leaf and mint were comminuted with a mechanical grinder so that the size of the various particles was less than one-quarter of an inch. Sawdust, obtained from a sawmill processing pine lumber, was thoroughly intermixed with the ground herbs in a ratio by volume of six parts ground herbs to four parts sawdust. The resulting mixture was soaked in water for a period of about one hour to ensure that the solid components were fully saturated with water.

The excess water was removed and the resulting soggy mass compressed to remove an additional portion of the remaining water. Portions of the mass weighing about 2 ounces were shaped into small elongated briquettes and tightly enclosed within a number of layers of aluminum foil. The ends of the layers were tightly closed around the damp composition forming an airtight, noncombustible package.

After about a week of storage, one of the packages was perforated along one surface and placed, with the perforated surface facing upward, on a bed of glowing charcoal briquettes in a barbecue grill. A fresh chicken was placed on the grill. The herb fragrance began to emanate from the perforated enclosure after about five minutes. Wafting of the pleasant and appetizing herb fragrances continued throughout the barbecuing period which extended for about two hours. The flavor of the herbs could not be detected in the cooked chicken. Upon completion of the barbecuing operation, examination of the aluminum foil enclosure revealed that all of the sawdust and herbs had been consumed during the barbecuing process.

Although one embodiment of the invention has been shown and described, it will be apparent that other adaptations and modifications can be made without departing from the true spirit and scope of the invention.

What is claimed is:

1. An article of manufacture comprising a perforatable, non-combustible, airtight enclosure and a comminuted mass disposed within said enclosure, said mass adapted for sequential combustion subsequent to perforation of said enclosure, said mass comprising herbs, water and a combustible hygroscopic substance selected from the group consisting of natural and artificial wood products, said water being sufficiently dispersed among said herbs to cause leaching of soluble essences from said herbs.

2. An article of manufacture in accordance with claim 1 wherein said water is present in an amount sufficient to saturate said hygroscopic substance and herbs.

3. An article of manufacture in accordance with claim 1 comprising from 25% to 75% by solid volume of herbs.

4. An article of manufacture in accordance with claim 1 wherein said herbs are a mixture of oregano, marjoram, thyme, sage, rosemary, mint, bay leaf, and the like.

5. An article of manufacture in accordance with claim 1 wherein said hygroscopic substance is a wood product.

6. A package for producing a pleasing fragrance during barbecuing comprising a sealed airtight non-combustible perforatable container, a comminuted mass within said container formed from a blend of water, herbs, and a combustible hygroscopic substance selected from the group consisting of natural and artificial wood products and having a kindling temperature below that of said herbs in a moistened condition and above the boiling point of water, the amount of said combustible hygroscopic substance being sufficient to sequentially create cellular voids upon introduction of sufficient oxygen to cause combustion and vaporization of a portion of said herb material adjacent to the newly-created cellular void.

7. A package in accordance with claim 6 wherein said combustible hygroscopic substance is sawdust.

8. An article of manufacture in accordance with claim 1 wherein said comminuted mass is tightly packed in said airtight enclosure.

References Cited

UNITED STATES PATENTS

| | | | |
|---|---|---|---|
| 2,967,023 | 1/1961 | Huckabee | 44—40 X |
| 3,029,724 | 4/1962 | Lee | 99—229 X |
| 3,096,180 | 7/1962 | Kasbaum | 99—140 |
| 3,124,432 | 3/1964 | Gentry | 44—40 |

PATRICK P. GARVIN, *Primary Examiner.*

C. F. DEES, *Assistant Examiner.*

U.S. Cl. X.R.

21—74; 99—140, 229; 206—46